(12) United States Patent
Knoblauch et al.

(10) Patent No.: US 11,352,062 B2
(45) Date of Patent: Jun. 7, 2022

(54) SUBFRAME FOR HOLDING AN ELECTRIC ENERGY ACCUMULATOR IN A MOTOR VEHICLE

(71) Applicant: Dr. Ing. h.c.F. Porsche Aktiengesellschaft, Stuttgart (DE)

(72) Inventors: Daniel Knoblauch, Obergruppenbach (DE); Johannes Lange, Wiernsheim (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 0 days.

(21) Appl. No.: 16/855,313

(22) Filed: Apr. 22, 2020

(65) Prior Publication Data

US 2020/0247472 A1 Aug. 6, 2020

Related U.S. Application Data

(63) Continuation-in-part of application No. 14/107,602, filed on Dec. 16, 2013, now abandoned.

(30) Foreign Application Priority Data

Dec. 21, 2012 (DE) .................... 10 2012 112 966.5

(51) Int. Cl.
*B62D 21/15* (2006.01)
*B60K 1/02* (2006.01)
*B60K 1/04* (2019.01)

(52) U.S. Cl.
CPC .............. *B62D 21/155* (2013.01); *B60K 1/02* (2013.01); *B60K 1/04* (2013.01)

(58) Field of Classification Search
CPC .... B60K 1/02; B60K 1/04; B60K 2001/0405; B60K 2001/0416; B60K 21/155; B62D 21/15; B62D 21/152; B62D 21/155
See application file for complete search history.

(56) References Cited

U.S. PATENT DOCUMENTS

| | | |
|---|---|---|
| 4,358,096 A | 11/1982 | Paton |
| 5,392,873 A | 2/1995 | Masuyama et al. |
| 5,460,234 A * | 10/1995 | Matsuura ................. B60G 9/02 180/65.1 |
| 5,534,364 A * | 7/1996 | Watanabe ........... H01M 2/1083 429/61 |
| 5,570,757 A | 11/1996 | Courtwright et al. |
| 5,593,001 A | 1/1997 | Takano |
| 6,170,906 B1 | 1/2001 | Kasuga |
| 6,981,566 B2 | 1/2006 | Unfried et al. |
| 7,025,160 B2 | 4/2006 | Iwakawa |

(Continued)

FOREIGN PATENT DOCUMENTS

| | | |
|---|---|---|
| DE | 102009015414 | 9/2010 |
| DE | 102009053138 | 5/2011 |

(Continued)

*Primary Examiner* — Frank B Vanaman
(74) *Attorney, Agent, or Firm* — Gerald E. Hespos; Michael J. Porco; Matthew T. Hespos

(57) ABSTRACT

A subframe (1) in a body of a motor vehicle is provided for connecting longitudinal and cross members for wheels (12) of an axle of the motor vehicle. A region (2) of the subframe (1) is designed as a supporting ring (3) for holding an electric energy accumulator (4). The subframe achieves a structurally simple and stable holding of an electric energy accumulator in the motor vehicle.

3 Claims, 1 Drawing Sheet

(56) References Cited

U.S. PATENT DOCUMENTS

| | | | |
|---|---|---|---|
| 7,594,559 B2* | 9/2009 | Kitoh | B62D 21/155 |
| | | | 180/232 |
| 7,886,861 B2 | 2/2011 | Nozaki et al. | |
| 7,913,788 B1 | 3/2011 | Bryer et al. | |
| 8,511,416 B2 | 8/2013 | Hiruma | |
| 8,616,319 B2* | 12/2013 | Yokoyama | B60K 1/04 |
| | | | 180/68.5 |
| 2003/0066694 A1* | 4/2003 | Mita | B60L 50/51 |
| | | | 180/65.1 |
| 2004/0194313 A1* | 10/2004 | Chernoff | B62D 33/02 |
| | | | 29/897.2 |
| 2004/0235315 A1 | 11/2004 | Masui | |
| 2005/0023056 A1 | 2/2005 | Harrup | |
| 2007/0051549 A1 | 3/2007 | Fukuda | |
| 2008/0283317 A1 | 11/2008 | Wagner et al. | |
| 2008/0283318 A1* | 11/2008 | Wagner | B62D 21/152 |
| | | | 180/68.5 |
| 2009/0242299 A1 | 10/2009 | Takasaki et al. | |
| 2010/0101885 A1 | 4/2010 | Nozaki et al. | |
| 2011/0132676 A1 | 6/2011 | Kodaira | |
| 2011/0315464 A1 | 12/2011 | Yokoyama et al. | |
| 2012/0111528 A1 | 5/2012 | Takeuchi et al. | |
| 2013/0119706 A1 | 5/2013 | Katayama et al. | |
| 2014/0174840 A1* | 6/2014 | Knoblauch | B60K 1/04 |
| | | | 180/68.5 |

FOREIGN PATENT DOCUMENTS

| | | |
|---|---|---|
| DE | 102011009987 | 8/2011 |
| DE | 102010018729 | 11/2011 |
| DE | 102011077385 | 12/2011 |
| DE | 102010033123 | 2/2012 |
| DE | 102011118412 | 5/2012 |
| FR | 2936484 | 4/2010 |
| WO | 2012028956 | 3/2012 |

* cited by examiner

SUBFRAME FOR HOLDING AN ELECTRIC ENERGY ACCUMULATOR IN A MOTOR VEHICLE

CROSS REFERENCE TO RELATED APPLICATION

This application is a continuation-in-part of application Ser. No. 14/107,602, filed Dec. 16, 2013, which claims priority under 35 USC 119 to German Patent Appl. No. 10 2012 112 966.5 filed on Dec. 21, 2012, the entire disclosure of which is incorporated herein by reference.

BACKGROUND

1. Field of the Invention

The invention relates to a subframe in a body of a motor vehicle for connecting longitudinal and cross members for wheels of an axle of the motor vehicle.

2. Description of the Related Art

Motor vehicles which have subframes of this type are known from the prior art.

Furthermore, a very wide variety of modifications relating to electrically drivable motor vehicles are known for motor vehicles. In this connection, use is made of electric machines that can be operated as a motor and/or a generator. The motor vehicles are equipped with an electric energy accumulator, such as a high-voltage battery.

DE 10 2010 018 729 A1 describes a motor vehicle with a subframe that forms part of an additional structure of a crumple zone of the motor vehicle. The additional structure has two support planes that are arranged one above the other in the vertical direction of the vehicle. A zone of the upper support plane is rigid against deformation and holds a battery box. Therefore this zone constitutes a safety cell for the battery box, and hence accident-induced damage to the batteries in the battery box is avoided. A further battery box is arranged below the upper support plane in the vertical direction of the vehicle and also is protected by a zone that is rigid against deformation.

DE 10 2010 033 123 A1 discloses an arrangement of an energy accumulator device arranged in an underfloor region on a body shell of a motor vehicle.

US 2008/0283317 A1 describes a protective housing for a vehicle battery in a vehicle. The protective housing is between two longitudinal members of the vehicle body and is connected to the longitudinal members and to a cross member of the vehicle.

It is the object of the invention to provide a subframe that is structurally simple and ensures stable holding of an electric energy accumulator in the motor vehicle.

SUMMARY OF THE INVENTION

The invention relates to a subframe is designed as a supporting ring for holding the electric energy accumulator. A subframe is intended to be understood as meaning an auxiliary structure configured according to corresponding loading requirements, for example a complex cast structure with struts, shells and ribbing.

The body is designed in the region of the subframe in such a manner that the subframe includes a unitarily or integrally cast metal ring that has a supporting function and accordingly is eminently suitable for holding the electric energy accumulator.

The supporting ring preferably has upper and lower supporting structures mounted to the supporting ring for enclosing and protecting the electric energy accumulator. The supporting structures preferably are composed of fiber-reinforced plastic as a particularly lightweight solution; or of aluminum diecasting as a cost-effective solution with good thermal conductivity.

The supporting structures preferably are formed by two half shells for surrounding and holding the energy accumulator from a lower side that faces a ground or roadway surface and an upper side opposite the lower side. The energy accumulator may be a high-voltage battery.

The subframe also may perform other functions.

The subframe preferably has a bifurcation or doubling for holding at least one power electronics unit for an electric machine. The bifurcation or doubling for holding the power electronics unit preferably forms a part of the supporting ring and preferably a part of the supporting ring that extends in the transverse direction of the vehicle. Accordingly, the power electronics unit that is held within the bifurcation or doubling of the subframe is arranged directly next to the energy accumulator that is enclosed by the supporting ring. The subframe also can have a region with fastening elements for at least one electric machine and fastening elements for the longitudinal and transverse links for the wheels of the axle.

At least one electric machine is provided and preferably is operable in a motor mode and a generator mode.

The subframe also can have crash elements.

The unitarily cast subframe preferably is provided with integral fastening regions for screwing the subframe to the vehicle body.

The supporting ring of the subframe functions to hold the electric energy accumulator and is arranged in a region that faces away from the rear in the case of a rear drive of the motor vehicle, or faces away from the front in the case of a front drive of the motor vehicle. In the case of a rear drive, the bifurcation or doubling for holding the at least one power electronics unit for the electric machine preferably is located adjacent to and behind the supporting ring, and therefore immediately adjacent to the electric energy accumulator that is held protectively within the supporting ring of the subframe. Furthermore, the region with the fastening elements for the electric machine and the longitudinal and transverse links is located behind the bifurcation or doubling that extends transversely across the subframe. The crash elements are arranged behind this region of the subframe that has the fastening elements for the electric machine and for the longitudinal and transverse links for the wheels. In the case of a front drive, by contrast, the arrangement of the elements is the other way around. The crash elements therefore are located in the front region of the subframe, and hence in the front region of the motor vehicle. Other elements are arranged more rearward, beginning with the region of the fastening elements for the electric machine and for the longitudinal and transverse links for the wheels, then with the bifurcation or doubling, and finally with the supporting ring that is formed partly by the transversely extending bifurcation or doubling that retains the power electronics.

The crash elements therefore are provided with respect to the front or rear end of the vehicle and are configured to absorb energy in the event of a crash.

Further features of the invention emerge from the enclosed drawing and the description of the preferred exemplary embodiment, that is reproduced in the drawing, without being restricted thereto.

DETAILED DESCRIPTION OF THE PREFERRED EMBODIMENTS

Figure 3:
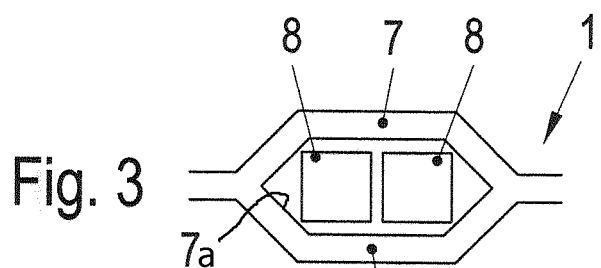
FIG. 3 is in an enlarged illustration of that region of the subframe that has the bifurcation/doubling.
Figure 1:
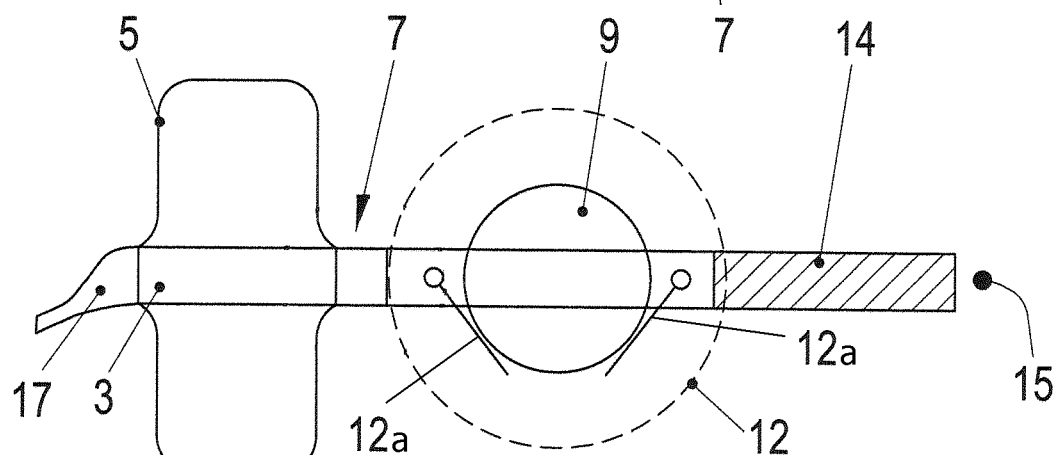
FIG. 1 is a schematic a side view of the subframe in the body of a passenger vehicle, with motor vehicle components assigned to the subframe.
Figure 2:
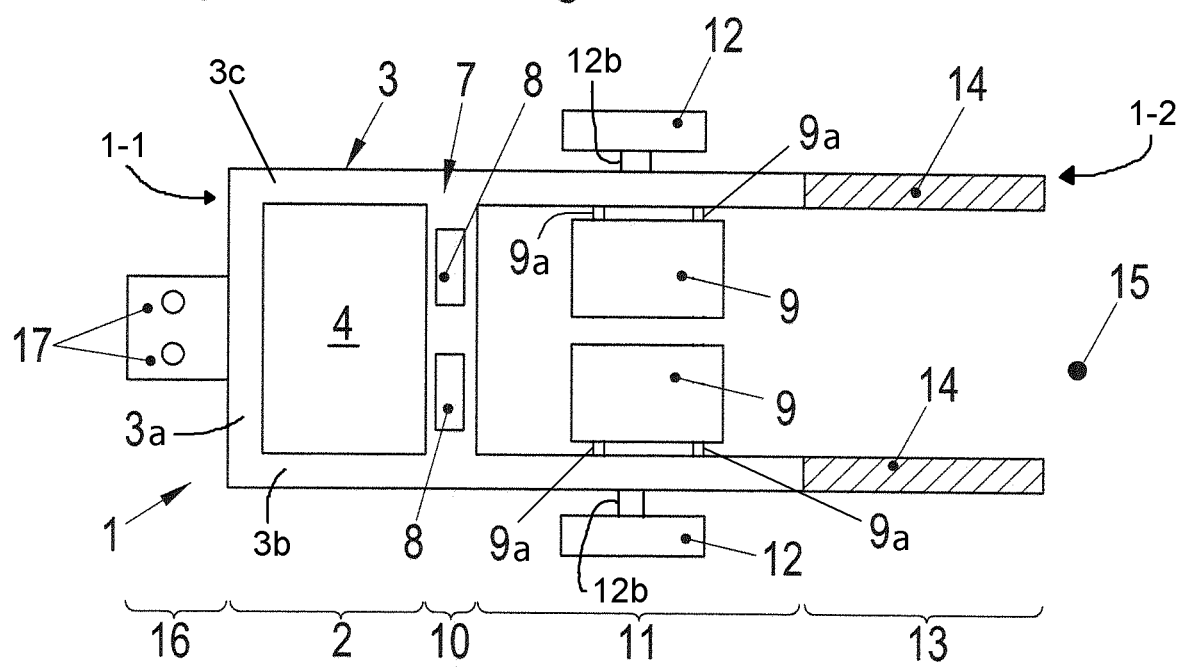
FIG. 2 is a top plan view of the arrangement of FIG. 1 with the upper supporting structure removed to show the electric energy accumulator within the area defined by the supporting ring.

FIGS. 1-3 show a unitary cast metal subframe 1 with opposite first and second ends 1-1 and 1-2. The first end 1-1 is at an intermediate position on an automotive vehicle, while the second end 1-2 is at a front or rear end of the automotive vehicle. The unitary cast metal subframe 1 has a region 2 that is designed as a supporting ring 3 for holding an electric energy accumulator 4, which in this instance is a high-voltage battery that generally is referred to as a traction battery and is used for driving the wheels of the vehicle. The supporting ring 3 holds an upper supporting structure 5 and a lower supporting structure 6 that are not part of the unitary cast metal subframe 1. Rather, the upper and lower supporting structures 6 are composed of fiber-reinforced plastic or a light weight metal and are in the form of two half shells for covering and protecting the energy accumulator 4. The lower supporting structure 6 is between the electric energy accumulator 4 and the roadway or ground surface on which the vehicle is positioned. The lower supporting structure 6 in this embodiment has a convex outer surface facing down and a concave upper surface facing toward the electric energy accumulator 4. The upper supporting structure 5 is on the side of the electric energy accumulator 4 opposite the lower supporting structure 6. In this embodiment, the upper supporting structure 5 has a concave lower surface facing toward and at least partly surrounding the electric energy accumulator. The upper supporting structure 5 further has an upper convex surface facing away from the electric energy accumulator 4. In other embodiments, one of the upper and lower supporting structures 5, 6 may be substantially planar. The upper and lower supporting structures 5 and 6 are connected securely to the supporting ring 3, for example, by bolts or screws and may also be connected to one another by bolts or screws.

The supporting ring 3 is a unitary part of the cast metal subframe 1 and in this embodiment has a rectangular shape, based on the top view, with a rectangular ring opening in which the electric energy accumulator 4 is positioned and supported. The rectangular supporting ring 3 is defined by and consists of: a transverse beam 3a extending transverse to the longitudinal direction of the vehicle at the first end 1-1 of the subframe 1; first and second side beams 3b, 3c extending in the longitudinal direction of the vehicle from opposite ends of the transverse beam 3a; and a bifurcated beam 7 extending in the transverse direction of the vehicle between the side beams 3b, 3c in a position opposed to the transverse beam 3a. The cast metal subframe 1 has other components that are unitary with the supporting ring 3, but are not required to complete the ring 3 that surrounds and protects the electric energy accumulator 4. These other components include plural supporting brackets extending into the opening defined by the supporting ring 3 for holding the electric energy accumulator 4 securely within the supporting ring 3 and at least one fastening tab 17 for mounting the cast metal subframe 1 to the remainder of the body of the vehicle. Additionally, the first and second side beams 3b and 3c extend in the longitudinal direction of the vehicle beyond the bifurcated beam 7 and toward the end 1-2 of the cast metal subframe 1. These longitudinal extensions of the side beams 3b, 3c are unitary parts of the subframe 1 but do not define part of the supporting ring 3 that surrounds and protects the electric energy accumulator 4. Similarly, although the brackets that support the electric energy accumulator 4 in the supporting ring 3 and the fastening tabs 17 that connect the subframe 1 to the body of the vehicle are unitary parts of the cast metal subframe 1 they do not contribute directly to the protective function of the supporting ring 3, and hence are not considered to be part of the supporting ring 3 for purposes of this description. Although the supporting ring 3 is rectangular in this embodiment, a nonrectangular frame-shape is possible in other embodiments. In particular, none of the beams 3a, 3b, 3c and 7 is required to be perfectly straight, and the actual configuration may be dictated by space requirements of other components of the vehicle.

The bifurcated beam 7 of the supporting ring 3 of the cast metal subframe 1 has at least one open region 7a for accommodating at least one power electronics unit 8 for an electric motor 9 of the vehicle. More particularly, this embodiment has two electric motors 9 on a side of the supporting ring 3 opposite the first end 1-1 of the subframe 1. The electric motors 9 are connected respectively to the power electronics units 8, which in turn are connected electrically to the electric energy accumulator 4 that is protectively surrounded by the supporting ring 3. The power electronics units 8 also are surrounded protectively by the opening 7a defined by the bifurcated beam 7 to ensure protection for the power electronics units 8. Additionally, the disposition of the power electronics units 8 in the opening 7a of the bifurcated beam 7 positions the power electronics units 8 conveniently between the electric motors 9 and the electric energy accumulator 4 that is within the supporting ring 3 and hence adjacent to the power electronics units 8. The opening 7a in the bifurcated beam 7 of the supporting ring 3 may extend entirely through the bifurcated beam 7 in a horizontal direction, entirely through the bifurcated beam 7 in a vertical direction or partly through the bifurcated beam in either a horizontal or vertical direction. Additionally, a single opening 7a can accommodate the two power electronics units 8 or two separate openings 7a can be provided so that each opening 7a in the bifurcated beam 7 accommodates one of the power electronics units 8. Still further, one or more covers (not shown) can be provided for covering and protecting the power electronics units 8. The one or more covers are formed separately from the cast panel subframe 1 and may be composed of fiber-reinforced plastic or a lightweight metal that is cast separately from the subframe 1 or that is stamp formed. Additionally, in certain embodiments, the upper and/or lower supporting structures 5 and 6 that cover and protect the electric energy accumulator 4 within the supporting ring 3 can be extended to cover the power electronics units 8.

The side beams 3b, 3c continue longitudinally beyond the bifurcated beam 7 of the supporting ring 3 and toward the second end 1-2 of the cast metal subframe 1 to a motor region 11 of the cast metal subframe 1. The electric motors 9 are positioned protectively between areas of the side beams 3b, 3c that project longitudinally beyond the supporting ring 3. Additionally, areas of the side beams 3b, 3c corresponding to the motor region 11 also align with the wheels 12. Supports 9a are cast integrally with the subframe 1 or are attached to the subframe 1 to receive components, such as brackets and bolts, for supporting the motors 9, as well as struts and suspension components 12a, 12b for the wheels 12, as shown in FIGS. 1 and 2.

The region 13 is disposed at the second and 1-2 of the subframe 1 and may be either the front or rear end of the vehicle depending on whether the vehicle is a rear drive vehicle or a front drive vehicle. More particularly, the region 13 has crash elements 14, as shown schematically in FIG. 2, and configured for absorbing energy in the event of a crash. The crash elements 14 may be unitary parts of the cast metal subframe 1 or may be separately formed crash elements 14 that are attached to the unitary cast metal subframe 1. Separately formed crash elements 14 that are attached to the cast metal subframe 1 give the automotive engineers a greater range of options for designing the energy absorbing features of the crash elements 14.

FIG. 2 identifies a point 15 that is either on the front end of the passenger vehicle or the rear end of the passenger vehicle in the longitudinal extent of the subframe 1. The first end 1-1 of the subframe 1, which faces away from the second end 1-2 of the subframe 1, has an additional fastening region 16 for screwing the subframe 1 to the rest of the body. In this respect, fastening tabs 17 for the region 16 are illustrated, and the screw connection to the rest of the body takes place at the fastening tabs 17. Of course, further connecting points for screwing the subframe 1 to the rest of the body can also be provided in the regions 2, 10 and/or 11.

The invention therefore discloses a particular design of an integral cast metal subframe for surrounding and protecting the electric energy accumulator 4 and the power electrons units 8 to produce an integrated electric drive module that can be attached easily to the remainder of the vehicle body.

What is claimed is:

1. A motor vehicle, comprising:
a body having a longitudinal end;
first and second wheels in proximity to the longitudinal end and spaced from one another in a lateral direction of the motor vehicle;
first and second electric machines disposed so that at least parts of the first and second electric machines are at positions on the motor vehicle between the first and second wheels; and
a subframe having opposite first and second ends, the second end of the subframe being adjacent the longitudinal end of the body of the vehicle, the subframe comprising: crash elements at the second end of the subframe for absorbing impacts in an event of a collision, a cast supporting ring consisting of left and right longitudinal supports, a first transverse support extending between the left and right longitudinal supports adjacent the first end of the subframe and a second transverse support integral with the left and right longitudinal supports and extending between the left and right longitudinal supports at a position between the first and second ends of the subframe, the second transverse support having a left end portion extending from the left longitudinal support toward the right longitudinal support, a right end portion extending from the right longitudinal support toward the left longitudinal support and a bifurcated region extending between the left and right end portions of the second transverse support, the bifurcated region having two transverse members that are joined to one another at left and right end portions of the second transverse support and being at locations laterally inward of the left and right longitudinal supports, the two transverse members of the second transverse support being spaced from one another at positions along the second transverse support between the left and right end portions of the second transverse support;
upper and lower half shells composed of fiber-reinforced plastic, the upper and lower half shells being mounted in the support ring and defining an enclosure that is disposed between the first and second transverse supports;
an electric energy accumulator disposed in the enclosure between the upper and lower half shells; and
first and second power electronics units between the transverse members of the second transverse support and being aligned with the respective first and second electric machines;
a further region between the second transverse support and the second end of the subframe with fastening elements for holding the first and second electric machines and the wheels on the subframe; and
at least the first transverse support having fastening regions for screwing the subframe to the body, and thereby securing the electric energy accumulator and the power electronics relative to the body.

2. The motor vehicle of claim 1, wherein each of the first and second electric machines is operable in a motor mode or in a generator mode.

3. The motor vehicle of claim 1, wherein the transverse supports of the supporting ring are at uniform heights.

* * * * *